United States Patent [19]
Berglund et al.

[11] Patent Number: 5,988,953
[45] Date of Patent: *Nov. 23, 1999

[54] TWO-PIECE ROTARY METAL-CUTTING TOOL AND METHOD FOR INTERCONNECTING THE PIECES

[75] Inventors: Mattias Berglund, Njutånger; Fredrik Lundberg, Askersund; Ingela Svensson, Linköping, all of Sweden

[73] Assignee: Seco Tools AB, Fagersta, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/929,462

[22] Filed: Sep. 15, 1997

[30] Foreign Application Priority Data

Sep. 13, 1996 [SE] Sweden .................. 9603325-3

[51] Int. Cl.⁶ .................................. B23B 51/00
[52] U.S. Cl. .................. 408/1 R; 76/108.6; 408/144; 408/226; 408/230; 408/231
[58] Field of Search ..................... 408/1 R, 144, 408/199, 200, 226, 227, 230, 231, 232; 76/108.6, 108.1

[56] References Cited

U.S. PATENT DOCUMENTS

| 932,071 | 8/1909 | Urbscheit | 408/233 |
|---|---|---|---|
| 2,259,611 | 10/1941 | Burger . | |
| 2,935,906 | 5/1960 | Andreasson | 408/144 |
| 3,359,837 | 12/1967 | Andreasson | 408/230 |
| 3,548,688 | 12/1970 | Kuch | 408/230 |
| 4,950,108 | 8/1990 | Roos | 408/230 |
| 5,399,051 | 3/1995 | Aken et al. | 408/226 |

FOREIGN PATENT DOCUMENTS

| 0 118 806 | 11/1987 | European Pat. Off. . | |
| 0 691 484 | 10/1996 | European Pat. Off. . | |
| 367 010 | 1/1921 | Germany . | |
| 384720 | 11/1921 | Germany | 408/230 |
| 2246965 | 4/1974 | Germany | 408/144 |

*Primary Examiner*—Daniel W. Howell
*Attorney, Agent, or Firm*—Burns, Doane, Swecker & Mathis, L.L.P.

[57] ABSTRACT

A tool includes a tool body and a cutting portion detachably mounted thereon, the tool being rotatable about a longitudinal center axis. The tool body includes flutes formed in an outer surface thereof, and a pair of forward projections at a front end thereof. The cutting portion includes front flutes formed in an external side thereof, and a pair of recesses extending circumferentially in communication with respective ones of the front flutes. To connect the cutting portion to the tool body, the cutting portion and tool body are converged longitudinally so that the projections enter the front flutes. Then, relative rotation is produced between the cutting portion and tool body to align the front flutes with the rear flutes while causing the projections to enter the recesses and form therewith a bayonet coupling.

13 Claims, 4 Drawing Sheets

FIG. 3A
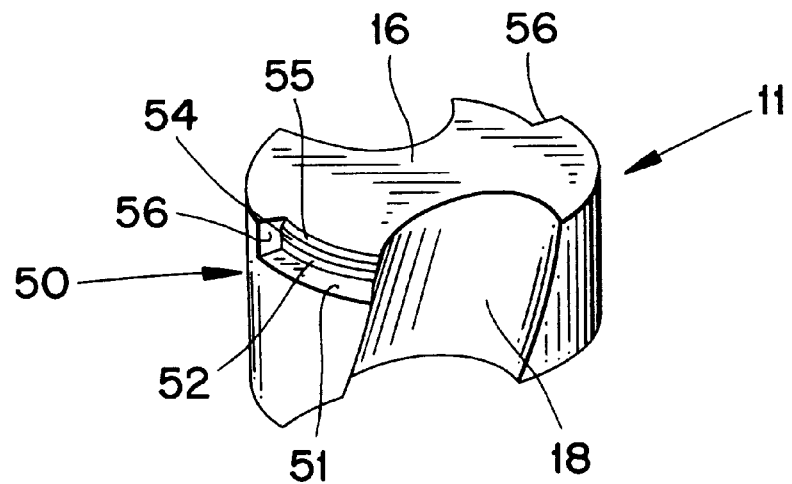
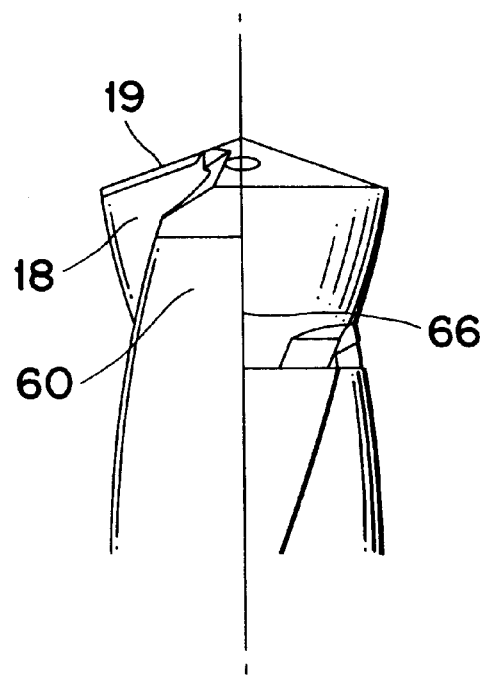
FIG. 9

FIG. 6
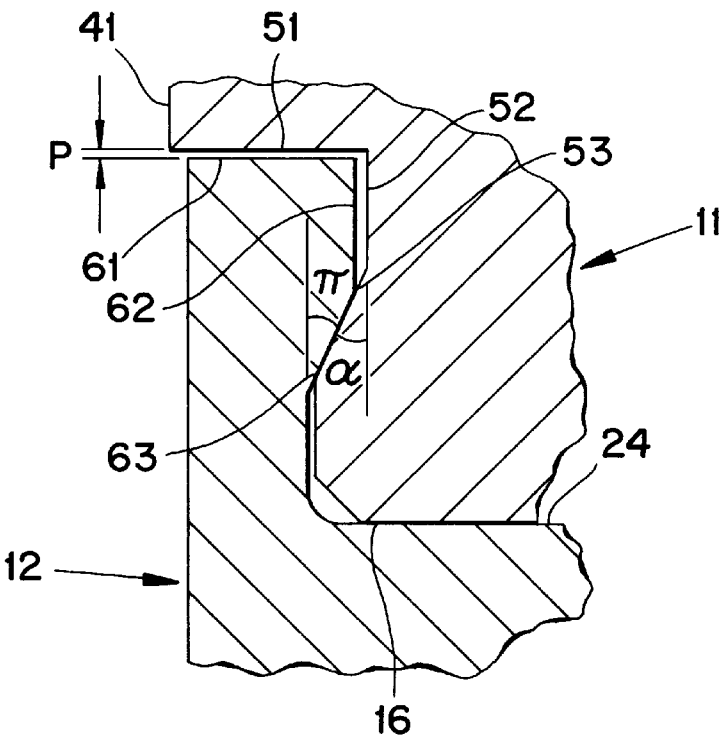
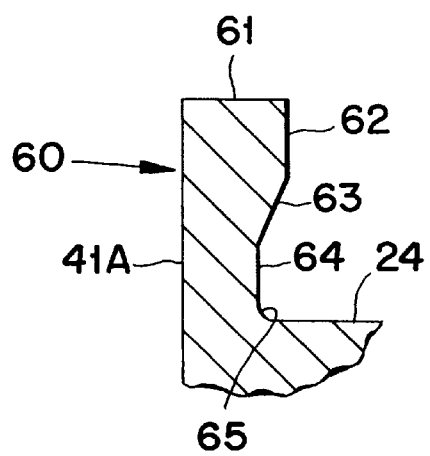
FIG. 7
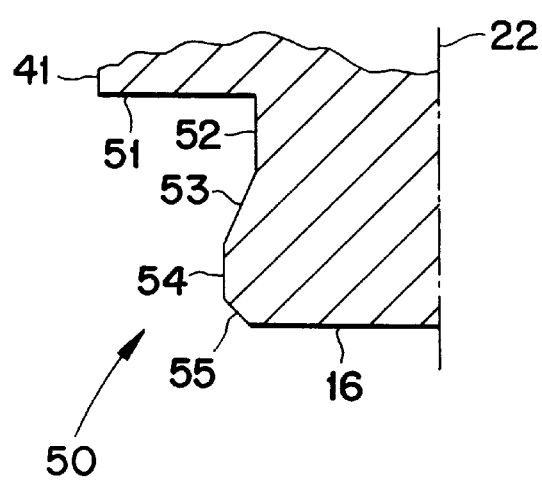
FIG. 8

TWO-PIECE ROTARY METAL-CUTTING TOOL AND METHOD FOR INTERCONNECTING THE PIECES

BACKGROUND OF THE INVENTION

The present invention relates to a tool for rotary, cutting machining, comprising a tool body and a cutting portion. The tool body has a front surface, and the cutting portion has a support surface provided to releaseably abut against the front surface in a substantially radial plane. The tool body and the cutting portion comprises means which cooperate for holding them together. The invention also relates to a cutting portion and a tool body as well as a method for mounting a cutting portion to a tool body.

PRIOR ART

It is previously known to use interchangeable cutting edges on different types of tools for cutting machining, especially when cutting a metallic workpiece. This technique however has practical limitations due to handling reasons when it comes to milling and drilling tools which rotate around a longitudinal axis.

Through DE-PS-367,010 and Burger U.S. Pat. No. 2,259,611, it is previously known to provide drills with lockable drill tips, wherein the drill tip is retained with the aid of dove-tail profiles or with press fit, respectively. The known tools however are impaired with drawbacks such as bad torsion transferring ability and troublesome mounting and dismounting.

The present invention has as one object to provide drilling and milling tools with interchangeable cutting edges, which eliminates problems associated with known techniques.

Another object with the present invention is provide a rigid tool preferably for drilling or milling wherein the cutting portion cooperates with the tool body via a bayonet coupling.

Another object of the present invention is to provide a rigid tool preferably for drilling or milling wherein the cutting portion can be easily exchanged by hand without time consuming screwing or soldering.

Another object of the present invention is to provide a tool with a self centering cutting portion.

SUMMARY OF THE INVENTION

These and other objects have been achieved by the present invention which relates to a rotary metal-cutting tool comprising, in combination, a tool body and a cutting portion attached to the tool body. The tool body includes a shank portion defining a longitudinal center axis, a front surface, and rear chip flutes formed in an external side surface of the shank portion for guiding chips rearwardly during a cutting operation. The cutting portion includes a rear support surface abutting the front surface, a front cutting face, and front chip flutes formed in a side surface of the cutting portion and intersecting the cutting face to form cutting edges therewith. The tool body and cutting portion are interconnected by a bayonet coupling formed by projections disposed on one of the tool body and cutting portion, and recesses formed in the other of the tool body and cutting portion. The projections are circumferentially offset with respect to the flutes and extend generally longitudinally. The recesses extend circumferentially from respective flutes. The flutes are sized to longitudinally receive respective projections during longitudinal insertion or removal of the cutting portion relative to the tool body.

The cutting portion is rotatable about the center axis relative to the tool body to transfer the projections from the respective flutes and into the recesses while bringing the front flutes into alignment with the rear flutes.

The invention also relates to a method of mounting a cutting portion to a tool body to form a metal-cutting rotary tool. The tool body includes a shank portion, a front surface, and rear chip flutes formed in an outer surface of the tool body. The cutting portion includes a support surface abutting the front surface, a cutting surface having cutting edges, and front chip flutes formed in an outer surface of the cutting portion. One of the tool body and cutting portion includes longitudinal projections, and the other of the tool body and the cutting portion includes circumferential recesses. Each recess communicates with a respective flute and extends less than 180°. The method comprises the steps of:

A) converging the cutting portion and tool body longitudinally toward one another to bring the projections into respective ones of the flutes that communicate with the circumferential recesses; and B) effecting relative rotation between the tool body and cutting portion to cause the projections to enter respective ones of the recesses to bring the front flutes into alignment with the rear flutes and to bring a stop surface of each projection into longitudinally opposing relationship with a stop surface of a respective recess for defining a bayonet connection preventing longitudinal displacement of the cutting portion relative to the tool body.

DESCRIPTION OF THE DRAWINGS

The objects and advantages of the invention will become apparent from the following detailed description of a preferred embodiment thereof in connection with the accompanying drawing in which like numerals designate like elements, and in which:

FIG. 3A shows the cutting portion in a perspective view from below;

FIGS. 6, 7 and 8 show cross-sections of a bayonet coupling of the tool;

FIG. 9 shows the assembled tool according to FIG. 1 in a magnified side view.

DETAILED DESCRIPTION OF A PREFERRED EMBODIMENT OF THE INVENTION

Figure 1:
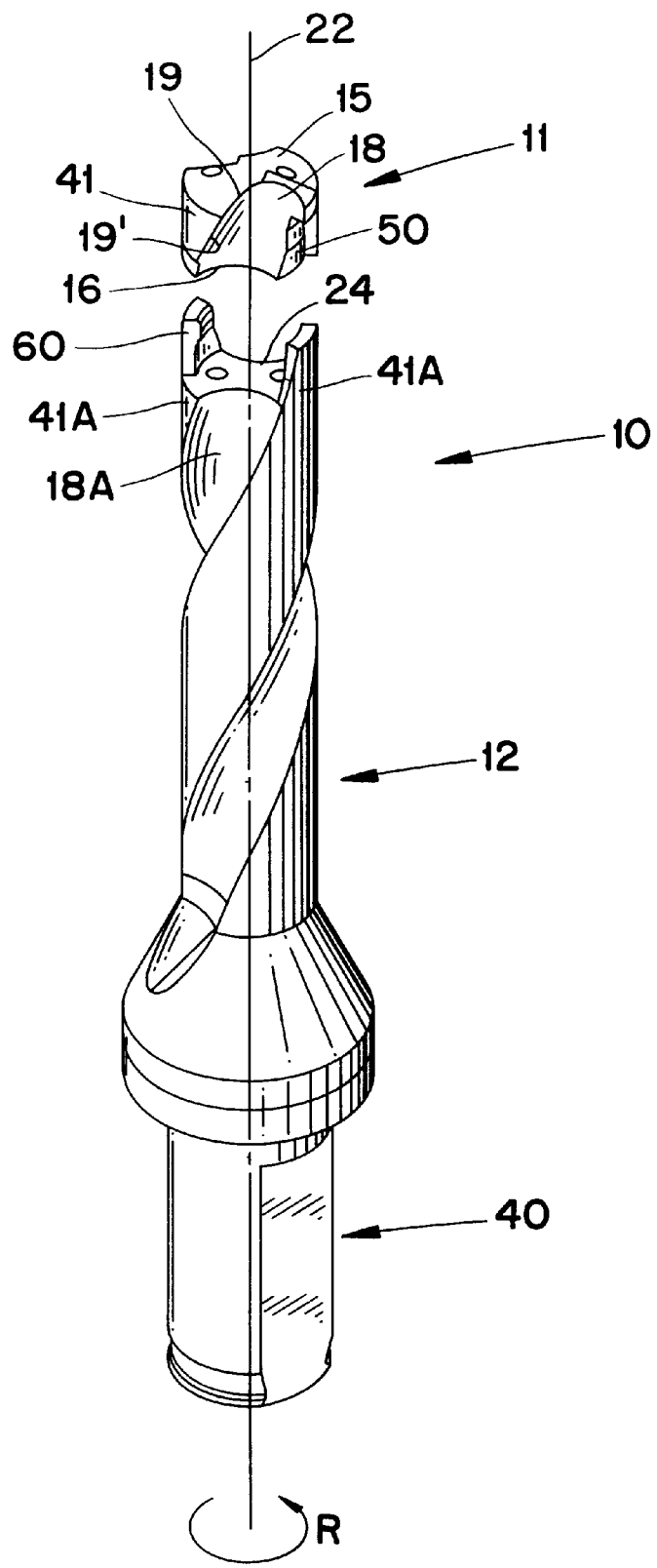
FIG. 1 shows a drilling tool according to the present invention, in an exploded perspective view.

The embodiment of a tool 10 according to the invention shown in FIG. 1 is a so called helix drill, which comprises a cutting portion or drill tip 11 and a drill body 12. The drill has a rotational direction R.

The drill tip 11 is provided with at least one cutting edge 19 in the forward end thereof facing away from the drill body 12, which tip is given different designs depending on the area of application.

Figure 4:
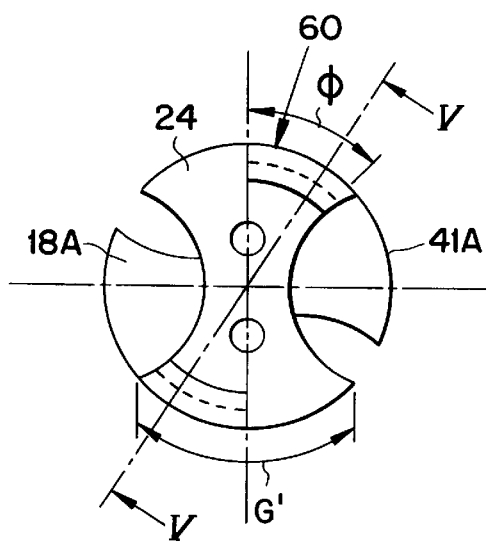
FIG. 4 shows the forward end surface of a tool body according to the present invention in top view.
Figure 5:
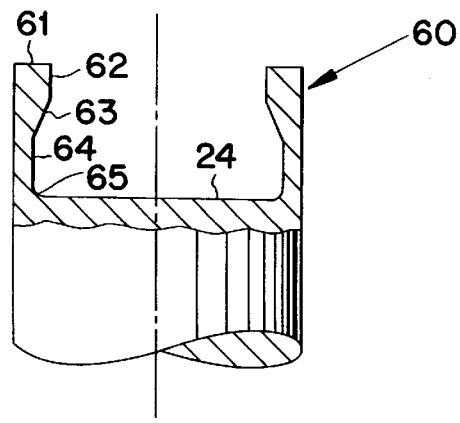
FIG. 5 shows the drill shank in a sectional view taken along the line V—V in FIG. 4.

The drill tip 11 is made of hard material, preferably cemented carbide and most preferably of injection molded cemented carbide, and comprises a front cutting surface formed by two upper clearance faces 15, a lower support surface 16 as well as first and second curved surfaces 41, 18 interconnecting the surfaces 15 and 16. All these surfaces and associated edges are integrated as one piece with the drill tip and consequently formed of the same material, i.e. preferably injection molded cemented carbide. The curved surfaces 18 form front chip flutes for conducting cuttings rearwardly. Lines of intersection between the chip flutes 18 and the clearance faces 15 form main cutting edges 19, preferably via reinforcing chambers, not shown. Lines of intersection between the first curved surfaces 41 and the chip flutes 18 form secondary cutting edges 19'. The chip flute is shown as helical but may alternatively be adapted for a drill body requiring straight chip flutes. The radially external parts between the chip flutes consist of protruding lands formed by the surfaces 41, each having a circumferential length G (FIG. 4). The largest diameter of the drill tip is the diametrical distance between the radially extreme points of the secondary cutting edges. The height of the drill tip is substantially the same as the largest diameter of the tip, in order to minimize the wear from chips on the joint between the drill tip and the drill body. Flushing holes 23, extending substantially parallel with the rotational axis 22, extend through the drill tip from the support surface 16 to the orifice in respective upper clearance surface 15.

Figure 2:
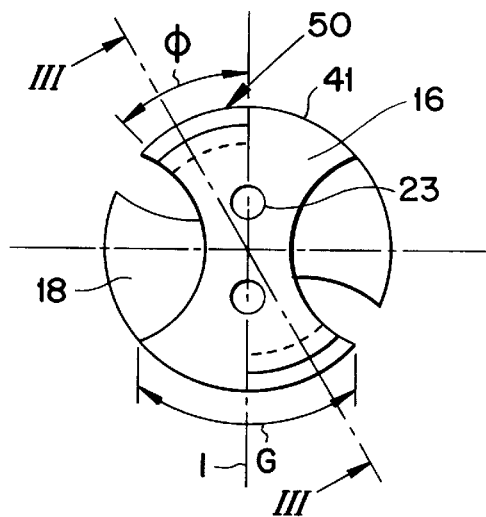
FIG. 2 shows a cutting portion according to the present invention in a bottom view.
Figure 3:
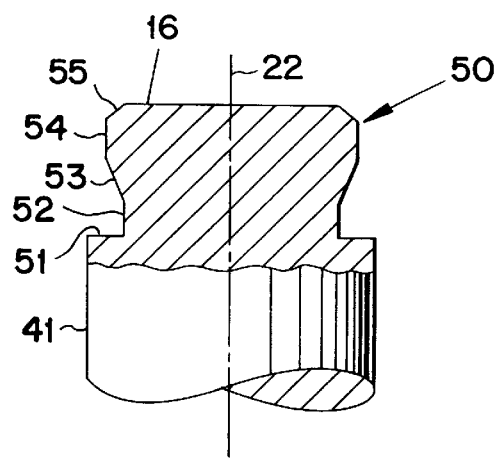
FIG. 3 shows the cutting portion in a sectional view taken along the line III—III in FIG. 2.

The support surface 16 according to FIGS. 2, 3 and 3A is substantially planar but comprises a recess 50 at the transition between the support surface 16 and the land 41. Each recess 50 comprises a first free or end surface 51 perpendicularly connected to both the land 41 and a second free surface 52 (see FIG. 8), which surface 52 in turn forms an acute angle α with a first guiding surface 53 (see FIG. 6). The surface 53 connects to a second guiding surface 54 oriented parallel to the rotational axis 22, and which connects to the support surface 16 via a radius or an entering bevel 55. The surface 53 is inclined obliquely relative to the center axis 22 so as to face generally radially inwardly and longitudinally rearwardly. The recess 50 has a stop surface 56 (FIG. 3A) which is parallel to the axis 22 and which suitably lies in an axial plane which intersects said axis. The recess 50 extends in a tangential direction from the chip flute 18 to about a midpoint of the circumferential length G of the associated land 41.

The drill body is made of a material which has a lower Young's modulus than cemented carbide. The drill body has helical rear chip flutes 18A (or straight chip flutes if required) and these can extend along the entire outer surface of a shank portion 40 of the body or along only a part thereof. The drill body 12 is provided with a front surface 24 at the end facing towards the drill tip 11, which surface 24 abuts against the support surface 16 of the drill tip 11. The largest diameter of the support surface 16 is larger than the largest diameter of the front surface 24 in order to minimize the wear from chips on the joint between the drill tip and the drill body. The drill body also includes curved surfaces 41A forming lands. The front surface 24 is substantially planar but comprises a projection 60 at the transition between the front surface 24 and the jacket surface of each land 41A. The height of the projection is somewhat less than that of the depth of the recess 50.

Each projection 60 comprises a first free or end surface 61 perpendicularly connected to the jacket surface 41A, said surface 61 also perpendicularly connected to a second free surface 62, which in its turn forms an acute angle π with a first guiding surface 63. The surface 63 connects to a second guiding surface 64 oriented parallel to the rotational axis 22.

The surface 64 connects to the front surface 24 via a radius 65. The surface 63 is oriented parallel to the surface 53 so as to face generally radially outwardly and longitudinally forwardly. The projection 60 has a stop surface 66, FIG. 9, which is parallel with the axis 22 and which suitably lies in an axial plane which contains said axis.

The smallest diameter of the front surface 24 is smaller than the largest diameter of the drill tip but larger than the smallest diameter of the drill tip. The projection 60 extends in a tangential direction from the chip flute 18A to about the midpoint of the circumferential tangential length G' of the associated land 41A.

The stop surfaces 56 and 66, respectively, should be as far from the rotational axis as possible for best moment transfer, i.e. they are arranged diametrically opposed each other. The drill tip must be symmetrically formed in order to retain the tool's concentricity at varying strain, i.e. in order to keep the drill tip centered relative to the drill body. The projections 60 and the recesses 50 lie at a distance from and substantially rearwardly of the associated cutting edge 19 in the tool's rotational direction R.

Mounting of the drill tip 11 on the drill body 12 is done as follows. The drill tip 11 is brought in the axial direction towards the drill body 12, so that each projection 60 is received in the associated chip flute 18 and so that the support surface 16 abuts against the front surface 24. Then, the drill tip is rotated in the direction R within an angle interval ø which is less than 360°, preferably less than 60°, relative to the drill body so that each projection 60 moves with a slide fit in the respective recess 50 until the stop surfaces 56 and 66 abut against each other. The drill tip 11 is now anchored in the drill body 12 in a satisfactory manner. Thus, the preformed spaces defined by the chip flutes 18 are used as the entrance and the exit of the bayonet coupling.

When the drill tip 11 must be replaced, the mounting procedure is reversed. The drill tip 11 then can be removed from the drill body 12 and be exchanged, preferably with the aid of a suitable key in engagement with the chip flutes on the drill tip. The key is preferably also used during mounting of the drill tip.

The surfaces which during the drilling operation must be in engagement are surfaces 53 and 63 as well as the support surface 16 and the front surface 24. The surfaces 53 and 63 cooperate to hold the drill tip such that it cannot loosen in the feed direction, for example during retraction of the tool. The surfaces 53 and 63 are preferably designed such that their cooperation results in some elastic deflection of the projection 60 due to the slide fit. A limited contact surface between surfaces 54 and 64 can be allowed, but this implies an increased moment at the radius 65. The drill tip is self-centering in the tool body, i.e. it moves such that its axis coincides with the rotational axis 22 if it has been displaced during the machining operation. The surface 55 will allow the radius 65 of the tool body to be relatively large. The surfaces 52 and 62 should not be in engagement with each other during the machining operation. That is realized by extending the surface 53 (see FIG. 6). The clearance surfaces 51 and 61 should not be in engagement with each other during the machining operation, and therefore a gap P is always present between them (see FIG. 6). The gap P is in the range of 0.1–1.0 mm. The support surface 16 will be pressed by the feed force against the front surface 24 during the machining operation, which means that the elastic deflection of the projection 60 tends to decrease somewhat, which however is counteracted because the projection 60 will be bent radially inwardly due to pressure on the front surface 24 from the feed force.

The invention is useable also for milling cutters. The drill tip is preferably coated with layers of, for example, $Al_2O_3$, TiN and/or TiCN. In certain cases, it can be well-founded to apply super hard material such as CBN or PCD on the cutting edges. Alternatively ceramic material can be used at injection molding of the drill tips.

Although the present invention has been described in connection with a preferred embodiment thereof, it will be appreciated by those skilled in the art that additions, modifications, substitutions and deletions not specifically described may be made without departing from the spirit and scope of the invention as defined by the appended claims.

What is claimed is:

1. A rotary metal-cutting tool comprising, in combination, a tool body and a cutting portion attached to the tool body;
   the tool body including: a shank portion defining a longitudinal center axis, a front surface, and rear chip flutes formed in an external side surface of the shank for guiding chips rearwardly during a cutting operation;
   the cutting portion including: a rear support surface abutting the front surface, a front cutting surface, and front chip flutes formed in a side surface of the cutting portion and intersecting the cutting face to form cutting edges therewith;
   the tool body and cutting portion being interconnected by a bayonet coupling formed by projections disposed on one of the tool body and cutting portion, and recesses formed in the other of the tool body and cutting portion, the projections being circumferentially offset with respect to the flutes and extending generally longitudinally; the recesses extending circumferentially from respective flutes; the flutes sized to longitudinally receive respective projections during longitudinal insertion or removal of the cutting portion relative to the tool body; the cutting portion being rotatable about the center axis relative to the tool body to transfer the projections from the respective flutes into the recesses while bringing the front and rear flutes into mutual alignment.

2. The tool according to claim 1 wherein the recesses are formed in the cutting portion; and the projections are formed in the tool body.

3. The tool according to claim 1 wherein the recesses are formed in the outer surface of the cutting portion; the cutting portion being rotatable relative to the tool body by an angle less than 360 degrees.

4. The tool according to claim 3 wherein the angle is less than 60 degrees.

5. The tool according to claim 1 wherein each of the projections includes a first surface inclined obliquely relative to the center axis, the first surface facing generally radially inwardly and longitudinally rearwardly; each of the recesses including a second surface inclined obliquely relative to the center axis, the second surface facing generally radially outwardly and longitudinally forwardly and opposing a respective first surface to prevent relative longitudinal movement of the cutting portion relative to the tool body.

6. The tool according to claim 5 wherein a material from which the tool body is formed has a lower Young's modulus than a material from which the cutting portion is formed, to enable the projections to bend elastically in a radial direction during relative rotation between the cutting portion and tool body.

7. The tool according to claim 1 wherein each of the projections includes a first surface inclined obliquely relative to the center axis, the first surface facing generally radially inwardly and longitudinally rearwardly; each of the recesses including a second surface inclined obliquely relative to the center axis, the second surface facing generally radially outwardly and longitudinally forwardly and opposing a respective first surface to prevent relative longitudinal movement of the cutting portion relative to the tool body.

8. The tool according to claim 6 wherein the outer surface of the cutting portion defines a pair of lands extending circumferentially by equal distances between the front flutes, each of the recesses extending circumferentially for a distance of about one-half of the circumferential distance of a respective land, each of the projections extending circumferentially a distance substantially equal to that of a respective recess.

9. The tool according to claim 1 wherein each of the projections includes a first surface inclined obliquely relative to the center axis, the first surface facing generally radially inwardly and longitudinally rearwardly; each of the recesses including a second surface inclined obliquely relative to the center axis, the second surface facing generally radially outwardly and longitudinally forwardly and opposing a respective first surface to prevent relative longitudinal movement of the cutting portion relative to the tool body.

10. The tool according to claim 1 wherein each of the projections includes a forwardly facing end surface, and the recess includes a forwardly facing end surface, and the recess includes a rearwardly facing end surface spaced from the forwardly facing end surface by a gap.

11. A cutting portion adapted to be connected to a tool body for rotary metal cutting, comprising a front cutting surface having at least one cutting edge, a rear support surface, and at least one chip flute formed in a side surface of the cutting portion for guiding cuttings, said cutting portion including coupling means defining part of a bayonet coupling adapted to connect a tool body with the cutting portion.

12. The cutting portion according to claim 11 wherein the coupling means comprises a recess extending circumferentially less than 60 degrees.

13. A method for mounting a cutting portion to a tool body to form a metal-cutting rotary tool; the tool body including a shank portion; a front surface, and rear chip flutes formed in an outer surface of the tool body; the cutting portion including a support surface abutting the front surface, a cutting surface having cutting edges, and front chip flutes formed in an outer surface of the cutting portion; one of the tool body and cutting portion including longitudinal projections, and the other of the tool body and cutting portion including circumferential recesses, each recess communicating with a respective flute and extending less than 180 degrees; the method comprising the steps of:

A) converging the cutting portion and tool body longitudinally toward one another to bring the projections into respective ones of the flutes that communicate with the circumferential recesses; and B) effecting relative rotation between the tool body and cutting portion to cause the projections to enter respective ones of the recesses to bring the front flutes into alignment with the rear flutes, and to bring a stop surface of each projection into longitudinally opposing relationship with a stop surface of a respective recess for defining a bayonet connection preventing longitudinal displacement of the cutting portion relative to the tool body.

* * * * *